United States Patent [19]

Nakao et al.

[11] Patent Number: 5,120,523

[45] Date of Patent: * Jun. 9, 1992

[54] METHOD FOR DISSOLUTION OF METAL

[75] Inventors: Yukimichi Nakao; Kyoji Kaeriyama; Aizo Yamauchi, all of Tsukuba, Japan

[73] Assignee: Agency of Industrial Science & Technology, Ministry of International Trade & Industry, Tokyo, Japan

[ * ] Notice: The portion of the term of this patent subsequent to Apr. 24, 2007 has been disclaimed.

[21] Appl. No.: 603,438

[22] Filed: Oct. 26, 1990

[30] Foreign Application Priority Data

Nov. 16, 1989 [JP] Japan .................................. 1-298487

[51] Int. Cl.⁵ .............................. C01B 9/00; C01G 1/06
[52] U.S. Cl. ...................................... 423/491; 423/22; 423/38; 423/49; 423/54; 423/87; 423/98; 423/109; 423/150; 423/492; 423/493; 423/494; 423/497
[58] Field of Search .............. 423/494, 493, 492, 491, 423/497, 658.5, 32, 38, 22, 49, 54, 87, 89, 98, 109, 150; 75/743

[56] References Cited

U.S. PATENT DOCUMENTS 3,131,998  5/1964  Swanson ........................... 423/139
4,269,676  5/1981  Libus et al. ........................ 423/38
4,684,404  8/1987  Kalocsai ............................ 423/38
4,919,716  4/1990  Nakao et al. ...................... 423/38

FOREIGN PATENT DOCUMENTS 53113791  3/1977  Japan .................................. 423/492
64-294830 11/1989  Japan .
11008265  3/1983  U.S.S.R. ............................. 423/54

OTHER PUBLICATIONS

Ditcey and Ashbrook "Solvent Extraction, Part I" Elsevier, Amsterdam, 1984 pp. 145 and 147.
J. Chem. Soc., Chem. Commun., 1988, pp. 729-730, N. R. C. Jackson et al., "New Reactions of Precious Metals and Their Binary Compounds in Solvents Containing Carbon Halides".

Primary Examiner—John Niebling
Assistant Examiner—Brian M. Bolam
Attorney, Agent, or Firm—Oblon, Spivak, McClelland, Maier & Neustadt

[57] ABSTRACT

A metal is dissolved by a method which comprises establishing contact of the metal with a quaternary ammonium compound and a halogenated hydrocarbon or with a quaternary ammonium compound, a halogenated hydrocarbon, and a polar solvent.

21 Claims, No Drawings

METHOD FOR DISSOLUTION OF METAL

BACKGROUND OF THE INVENTION

1. Field of the Invention

This invention relates to a method for the dissolution of a metal. More particularly, this invention relates to a method for the dissolution of a metal by the contact of the metal with (1) a quaternary ammonium compound and a halogenated hydrocarbon or (2) a quaternary ammonium compound and a halogenated hydrocarbon and a polar solvent.

2. Description of the Prior Art

The dissolution of a metal is an indispensable step for extraction and recovery of the metal from a mixture containing the metal and is extremely important from the industrial point of view. For the dissolution of a metal, a method which comprises dissolving the metal in the aqueous solution of an inorganic acid such as hydrochloric acid has been heretofore employed.

The conventional method for effecting the dissolution of a metal by the use of an inorganic acid has the disadvantages that the inevitable use of a strongly acidic aqueous solution endangers workers handling the solution and gives rise to a large volume of waste water, and that high costs are incurred in the disposal of this waste water.

For solving these problems of the prior art, the present inventors carried out various studies in search of a method for the dissolution of a metal without use of any inorganic acid and consequently invented a method for the dissolution of a metal by the contact of the metal with a halogenated hydrocarbon in the presence of a cationic surfactant. This invention was granted U.S. Pat. No. 4,919,716.

However, this method has the following problems. Since the surfactant has a large molecular weight, the number of mols of the surfactant required for the dissolution is unduly large. Further, the surfactant is generally expensive. After further studies, the inventors have found that numerous metals are dissolved by being brought into contact with a quaternary ammonium compound and a halogenated hydrocarbon or with a quaternary ammonium compound, a halogenated hydrocarbon, and a polar solvent. The present invention has been completed using this knowledge.

SUMMARY OF THE INVENTION

The present invention is specifically directed to providing a method for the dissolution of a metal, which comprises bringing the metal into contact with a quaternary ammonium compound and a halogenated hydrocarbon or with a quaternary ammonium compound, a halogenated hydrocarbon, and a polar solvent.

DETAILED DESCRIPTION OF THE PREFERRED EMBODIMENTS

In the method of the present invention, the contact of a metal with a quaternary ammonium compound and a halogenated hydrocarbon converts the metal into an easily dissolvable compound.

Specifically, the metal under treatment is caused to form a corresponding metal halogenide by being provided with a halogen atom from the halogenated hydrocarbon. The dissolution of the metal ensues from the conversion of this metal halide into an ion pair, i.e. a polyhalogeno-metal anion complex and a quaternary ammonium cation, due to the action of the quaternary ammonium compound.

Under some conditions, the ion pair may be dissolved in the halogenated hydrocarbon itself. In most cases, however, the ion pair is not easily dissolved thoroughly in the halogenated hydrocarbon but is precipitated therein. In order for the dissolution to proceed fully, the reaction system requires addition thereto of a polar solvent having strong dissolving power. These include water and organic solvents such as a lower alcohol or, N,N-dimethyl formamide. The addition of an organic solvent to the reaction system may be made after the ion pair has been precipitated. When the solvent is mixed with the quaternary ammonium compound and the halogenated hydrocarbon from the beginning, the metal is dissolved without inducing the precipitation of the ion pair. When water is used as a polar solvent, since it is insoluble in the halogenated hydrocarbon, first the metal is brought into contact with the quaternary ammonium compound and the halogenated hydrocarbon and then the consequently formed ion pair is separated from the reaction mixture and dissolved by the addition of water. In either case, the end point of the dissolution can be easily confirmed by the fact that the metal placed in the reaction system ceases to be visible.

The time required for the dissolution of a metal varies with the particular kind of metal subjected to the dissolution, the kinds and concentrations of the quaternary ammonium compound and the halogenated hydrocarbon used, and the kind of the solvent. The dissolution is accelerated by heightening the treating temperature.

The quaternary ammonium compounds which can be advantageously used in the method of this invention are those represented by the following formula:

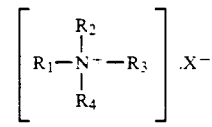

wherein $R_1$, $R_2$, $R_3$, and $R_4$ independently stand for one member selected from the class consisting of a hydrogen atom and hydrocarbon groups of not more than seven carbon atoms, provided that at least one of the substituents is a hydrocarbon group, and $X^-$ stands for one member selected from the class consisting of chlorine ion and bromine ion. Specifically, these quaternary ammonium compounds include monomethylamine hydrochloride, dimethylamine hydrochloride, trimethylamine hydrochloride, benzylamine hydrochloride, cyclohexylamine hydrochloride, tetraethylammonium bromide, tetraethylammonium chloride, and n-butylpyridinium chloride, for example. From the standpoint of practical use, monomethylamine hydrochloride, tetraethylamine bromide, tetraethylammonium chloride, tetra-n-butylammonium bromide, benzylamine hydrochloride, cyclohexylamine hydrochloride, and n-butylpyridinium chloride prove to be particularly desirable. Such a quaternary ammonium compound must be used in an amount of at least one mol per mol of the metal to be dissolved.

The halogenated hydrocarbons which can be advantageously used in the method of this invention are chlorinated hydrocarbons and brominated hydrocarbons. Specifically, benzyl chloride, benzal chloride, benzotrichloride, carbon tetrachloride, chloroform, benzyl bromide, bromobenzene, and cyclohexyl bromide, for example, are usable.

Among the halogenated hydrocarbons mentioned above, benzyl chloride and benzyl bromide are particularly preferred.

Such a halogenated hydrocarbon must be used in an amount of at least 10 mols per mol of the metal to be dissolved.

The quaternary ammonium compound need not be dissolved wholly in the halogenated hydrocarbon but may be suspended therein. When the quaternary ammonium compound remains in a suspended state in, the halogenated hydrocarbon, it is gradually dissolved as the dissolution of the metal proceeds. The polar solvents which can be advantageously used in the method of this invention include water and organic solvents such as ethanol, methanol, and N,N-dimethyl formamide, for example.

The metals which are dissolved effectively by the method of this invention include both typical metals and transition metals, specifically manganese, iron, cobalt, copper, zinc, antimony, magnesium, chromium, palladium, tin, nickel, lead, and bismuth, for example.

The method for the dissolution of a metal according with this invention is simple in procedure as demonstrated in the working examples set out hereinbelow. It is applicable to numerous metals. The quaternary ammonium compound, halogenated hydrocarbon, and solvent used in this method are inexpensive and are not very dangerous. By this method, therefore, the dissolution of a metal is accomplished economically and safely.

Now, this invention will be described more specifically below with reference to working examples.

EXAMPLES 1 TO 6

In 10 g of benzyl chloride, 1 mmol of tetraethylammonium chloride added thereto and 0.2 mmol of a metal indicated in Table 1 added thereto in a powdery state were stirred and heated on a bath at 100° C. for 24 hours. The resultant hot mixture was cooled to room temperature. The product consequently precipitated was separated by decantation and then dissolved by addition of 10 g of a solvent indicated in Table 1. A sample containing no residual metal power at the end of the procedure was defined as representing a dissolution ratio of 100%. In the case of a sample containing residual metal powder (Example 2), the residual metal powder was separated from the solution by decantation, washed with methanol, dried, and then weighed. The dissolution ratio of metal in this sample was determined based on the difference between the amount of the residual metal powder and the amount of metal powder initially added to the mixture. The results were as shown in Table 1.

TABLE 1

| Example | Metal | Solvent | Dissolution ration (%) |
|---|---|---|---|
| 1 | Manganese | Ethanol | 100 |
| 2 | Iron | Ethanol | 96 |
| 3 | Cobalt | water | 100 |
| 4 | Copper | DMF* | 100 |
| 5 | Zinc | Methanol | 100 |
| 6 | Antimony | Methanol | 100 |

*N,N-dimethyl formamide

EXAMPLES 7 TO 12

In 9 g of ethanol, 1 g of benzyl chloride and 1 mmol of monomethylamine hydrochloride added thereto and 0.2 mmol of a metal indicated in Table 2 added thereto in a powdery state were stirred and heated on a bath at 80° C. A sample having the metal powder wholly dissolved therein at the end of the heating was defined as representing a dissolution ratio of 100%. In the case of a sample (Example 11) containing a residual metal powder, the residual metal powder was separated from the solution by decantation, washed with methanol, dried, and then weighed. The dissolution ratio was determined based on the difference between the weight of the residual metal powder and the weight of the initially added metal powder. The results were as shown in Table 2.

TABLE 2

| Example | Metal | Heating time (hrs) | Dissolution ratio (%) |
|---|---|---|---|
| 7 | Magnesium | 0.5 | 100 |
| 8 | Chromium | 24 | 100 |
| 9 | Iron | 24 | 100 |
| 10 | Zinc | 1 | 100 |
| 11 | Palladium | 24 | 40 |
| 12 | Tin | 24 | 100 |

EXAMPLES 13 AND 14

In 9 g of ethanol, 1 g of benzyl bromide and 1 mmol of tetraethylammonium bromide added thereto and dissolved therein and 0.2 mmol of a metal indicated in Table 3 added thereto in a powdery state were stirred and heated on a bath at 80° C. for 24 hours. The dissolution ratio of metal was determined in the same manner as in EXAMPLES 7 to 12. The results were as shown in Table 3.

TABLE 3

| Example | Metal | Dissolution ratio (%) |
|---|---|---|
| 13 | Lead | 63 |
| 14 | Bismuth | 100 |

EXAMPLES 15 TO 17

In 9 g of ethanol, 1 g of benzyl chloride, 0.2 mmol of nickel powder, and 1 mmol of a quaternary ammonium compound indicated in Table 4 added thereto were stirred and heated on a bath at 80° C. for 24 hours. The dissolution ratio of metal was determined in the same manner as in Examples 7 to 12. The results were as shown in Table 4.

TABLE 4

| Example | Quaternary ammonium compound | Dissolution ratio (%) |
|---|---|---|
| 15 | Benzylamine hydrochloride | 100 |
| 16 | Cyclohexylamine hydrochloride | 100 |
| 17 | n-Butylpyridinium chloride | 100 |

EXAMPLES 18 TO 23

In 10 g of benzyl bromide, 1 mmol of tetra-n-butylammonium bromide added thereto and 0.2 mmol of a metal indicated in Table 5 added thereto in a powdery state were stirred and heated on a bath at 100° C. The dissolution ratio of metal was determined in the same manner as in Examples 7 to 12. The results were as shown in Table 5.

TABLE 5

| Example | Metal | Heating time (hrs) | Dissolution ratio (%) |
|---|---|---|---|
| 18 | Iron | 1 | 100 |
| 19 | Cobalt | 8 | 100 |
| 20 | Zinc | 0.5 | 100 |
| 21 | Silver | 0.5 | 100 |
| 22 | Tin | 0.5 | 100 |
| 23 | Antimony | 2 | 100 |

What is claimed is:

1. A method for the dissolution of a metal, which comprises establishing contact of said metal with a halogenated hydrocarbon and a quaternary ammonium compound represented by the following formula:

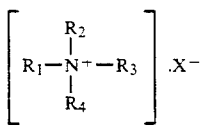

wherein $R_1$, $R_2$, $R_3$, and $R_4$ each independently stand for one member selected from the group consisting of a hydrogen atom and a hydrocarbon group of not more than 2 carbon atoms, provided that at least one of the substituents in a hydrocarbon group, and X stands for a member selected from the group consisting of chlorine ion and bromine ion.

2. A method according to claim 1, wherein said quaternary ammonium compound for contact with said metal is used in an amount of at least 1 mol per mol of said metal.

3. A method according to claim 1, wherein said quaternary ammonium compound is at least one member selected from the group consisting of monomethylamine hydrochloride, dimethylamine hydrochloride, trimethylamine hydrochloride, benzylamine hydrochloride, cyclohexylamine hydrochloride, tetraethylammonium bromide, tetraethylammonium chloride, n-butylpyridinium chloride, and tetra-n-butylammonium bromide.

4. A method according to claim 3, wherein said quaternary ammonium compound is at least one member selected from the group consisting of monomethylamine hydrochloride, tetraethylammonium bromide, tetraethylammonium chloride, benzylamine hydrochloride, cyclohexylamine hydrochloride, n-butylpyridinium chloride, and tetra-n-butylammonium bromide.

5. A method according to claim 1, wherein at least two of the substituents, $R_1$, $R_2$, $R_3$, and $R_4$, in the formula representing said quaternary ammonium compound are coupled to each other.

6. A method according to claim 1, wherein said halogenated hydrocarbon for contact with said metal is used in an amount of at least 10 mols per mol of said metal.

7. A method according to claim 1, wherein said halogenated hydrocarbon is selected from the group consisting of chlorinated hydrocarbons and brominated hydrocarbons.

8. A method according to claim 7, wherein said chlorinated hydrocarbon is at least one member selected from the group consisting of benzyl chloride, benzal chloride, benzotrichloride, carbon tetrachloride, and chloroform.

9. A method according to claim 7, wherein said brominated hydrocarbon is at least one member selected from the group consisting of benzyl bromide, bromobenzene, and cyclohexyl bromide.

10. A method according to claim 1, wherein said metal is at least one member selected from the group consisting of manganese, iron, cobalt, copper, zinc, antimony, magnesium, chromium, palladium, tin, nickel, lead, and bismuth.

11. A method for the dissolution of a metal, which comprises establishing contact of said metal with a quaternary ammonium compound represented by the following formula:

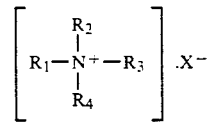

wherein $R_1$, $R_2$, $R_3$, and $R_4$ independently stand for one member selected from the class consisting of a hydrogen atom and hydrocarbon groups of not more than seven carbon atoms, provided that at least one of the substituents is a hydrocarbon group, and $X^-$ stands for one member selected from the class consisting of chlorine ion and bromine ion, a halogenated hydrocarbon, and a polar solvent.

12. A method according to claim 11, wherein said quaternary ammonium compound for contact with said metal is used in an amount of at least 1 mol per mol of said metal.

13. A method according to claim 11, wherein said quaternary ammonium compound is at least one member selected from the group consisting of monomethylamine hydrochloride, dimethylamine hydrochloride, trimethylamine hydrochloride, benzylamine hydrochloride, cyclohexylamine hydrochloride, tetraethylammonium bromide, tetraethylammonium chloride, n-butylpyridinium chloride, and tetra-n-butylammonium bromide.

14. A method according to claim 13, wherein said quaternary ammonium compound is at least one member selected from the group consisting of monomethylamine hydrochloride, tetraethylammonium bromide, tetraethylammonium chloride, benzylamine hydrochloride, cyclohexylamine hydrochloride, n-butylpyridinium chloride, and tetra-n-butylammonium bromide.

15. A method according to claim 11, wherein at least two of the substituents, $R_1$, $R_2$, $R_3$, and $R_4$, in the formula representing said quaternary ammonium compound are coupled to each other.

16. A method according to claim 11, wherein said halogenated hydrocarbon for contact with said metal is used in an amount of at least 10 mols per mol of said metal.

17. A method according to claim 11, wherein said halogenated hydrocarbon is selected from the group consisting of chlorinated hydrocarbons and brominated hydrocarbons.

18. A method according to claim 17, wherein said chlorinated hydrocarbon is at least one member selected from the group consisting of benzyl chloride, benzal chloride, benzotrichloride, carbon tetrachloride, and chloroform.

19. A method according to claim 17, wherein said brominated hydrocarbon is at least one member selected from the group consisting of benzyl bromide, bromobenzene, and cyclohexyl bromide.

20. A method according to claim 11, wherein said polar solvent is at least one member selected from the group consisting of water, ethanol, methanol, and N,N-dimethyl formamide.

21. A method according to claim 11, wherein said metal is at least one member selected from the group consisting of manganese, iron, cobalt, copper, zinc, antimony, magnesium, chromium, palladium, tin, nickel, lead, and bismuth.

* * * * *